US010262161B1

(12) United States Patent
McClintock et al.

(10) Patent No.: US 10,262,161 B1
(45) Date of Patent: Apr. 16, 2019

(54) SECURE EXECUTION AND TRANSFORMATION TECHNIQUES FOR COMPUTING EXECUTABLES

(71) Applicant: Amazon Technologies, Inc., Seattle, WA (US)

(72) Inventors: Jon Arron McClintock, Seattle, WA (US); Darren Ernest Canavor, Redmond, WA (US); Harsha Ramalingam, Kirkland, WA (US); George Nikolaos Stathakopoulos, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/580,023

(22) Filed: Dec. 22, 2014

(51) Int. Cl.
*G06F 21/71* (2013.01)
(52) U.S. Cl.
CPC .................................. *G06F 21/71* (2013.01)
(58) Field of Classification Search
CPC ........................................................ G06F 21/71
USPC ......................................................... 713/190
See application file for complete search history.

(56) References Cited

U.S. PATENT DOCUMENTS

| 8,495,388 | B2* | 7/2013 | Zunke | G06F 21/123 |
| | | | | 713/190 |
| 8,752,140 | B1* | 6/2014 | Paczkowski | G06F 21/57 |
| | | | | 713/168 |
| 2008/0282093 | A1* | 11/2008 | Hatakeyama | G06F 12/1416 |
| | | | | 713/190 |
| 2008/0301452 | A1* | 12/2008 | Horne | G06F 21/16 |
| | | | | 713/176 |
| 2009/0144561 | A1* | 6/2009 | Davidson | G06F 21/50 |
| | | | | 713/190 |
| 2010/0115286 | A1* | 5/2010 | Hawkes | G06F 12/1408 |
| | | | | 713/189 |
| 2012/0159194 | A1* | 6/2012 | Anderson | H04L 9/002 |
| | | | | 713/190 |

(Continued)

OTHER PUBLICATIONS

International Organization for Standardization/ International Electrotechnical Commission, "Information technology—Trusted Platform Module—Part 1: Overview," International Standard, ISO/IEC 11889-1(E), May 15, 2009, 20 pages.

(Continued)

*Primary Examiner* — Khalil Naghdali
(74) *Attorney, Agent, or Firm* — Davis Wright Tremaine LLP (57) ABSTRACT

Techniques described and suggested herein include the use of transformation parameters, such as mathematical and/or cryptographic operations, to permute various aspects of executables so as to control executable code authorized to run on one or more hosts. For example, a set of transformation parameters, such as a mathematical operation and a specified value upon which the mathematical operation may operate, are associated with a host or group of hosts. The set of transformation parameters may be applied to one or more runtime-related numerical locations associated with an executable that is intended to run on the specified hosts. At runtime, appropriately encoded executables are decoded by the specified hosts and operate normally, while differently encoded or unencoded executables are inoperable by the specified hosts.

20 Claims, 7 Drawing Sheets

(56) References Cited

U.S. PATENT DOCUMENTS

2015/0067874 A1* 3/2015 Johnson ............... G06F 21/14
  726/26
2015/0082399 A1* 3/2015 Wu ..................... G06F 21/6209
  726/6
2016/0292137 A1* 10/2016 Warila ..................... G06F 8/24

OTHER PUBLICATIONS

International Organization for Standardization/International Electrotechnical Commission, "Information technology—Trusted Platform Module—Part 2: Design principles," International Standard, ISO/IEC 11889-2(E), May 15, 2009, 152 pages.

International Organization for Standardization/International Electrotechnical Commission, "Information technology—Trusted Platform Module—Part 3: Structures," International Standard, ISO/IEC 11889-3:2009(E), 204 pages.

International Organization for Standardization/International Electrotechnical Commission, "Information technology—Trusted Platform Module—Part 4: Commands," International Standard, ISO/IEC 11889-4:2009(E), 254 pages.

Trusted Computing Group, "TPM Main, Part 1 Design Principles," Specification Version 1.2, Level 2 Revision 103, Jul. 9, 2007, 182 pages.

Trusted Computing Group, "TPM Main, Part 2 TPM Structures," Specification Version 1.2, Level 2 Revision 103, Jul. 9, 2007, 198 pages.

Trusted Computing Group, "TPM Main, Part 3 Commands," Specification Version 1.2, Level 2 Revision 103, Jul. 9, 2007, 330 pages.

Trusted Computing Group, "TPM Main, Part 1 Design Principles," Specification Version 1.2, Revision 116, Mar. 1, 2011, 184 pages.

Trusted Computing Group, "TPM Main, Part 2 TPM Structures," Specification Version 1.2, Revision 116, Mar. 1, 2011, 201 pages.

Trusted Computing Group, "TPM Main, Part 3 Commands," Specification Version 1.2, Revision 116, Mar. 1, 2011, 339 pages.

* cited by examiner

SECURE EXECUTION AND TRANSFORMATION TECHNIQUES FOR COMPUTING EXECUTABLES

BACKGROUND

The use of network computing and storage has proliferated in recent years. The resources for network computing and storage are often provided by computing resource providers who leverage large-scale networks of computers, servers and storage drives to enable clients, including content providers, online merchants and the like, to host and execute a variety of applications and web services. Content providers and online merchants, who traditionally used on-site servers and storage equipment to host their websites and store and stream content to their customers, often forego on-site hosting and storage and turn to using the resources of the computing resource providers. The usage of network computing allows content providers and online merchants, among others, to efficiently and to adaptively satisfy their computing needs, whereby the computing and storage resources used by the content providers and online merchants are added or removed from a large pool provided by a computing resource provider as need and depending on their needs.

As network computing and storage have increased in popularity, however, security attacks on related infrastructure have also increased. Many of such attacks involve the surreptitious and/or malicious placement of executable code on hosts capable of running the code. While firewalls and related technology may reduce the attack surface and prevent such surreptitious and/or malicious placement, enterprising malicious entities are constantly developing new ways for contravening such measures. Additionally, selective prevention of traffic from reaching a given host, for example, may unintentionally cause legitimate traffic and/or executable code from reaching the host.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include the use of transformation parameters, such as mathematical and/or cryptographic operations, to permute memory addresses related to memory access and/or dependency mapping in a targeted fashion so as to control a set of applications or other executable code authorized to run on one or more hosts. For example, a set of transformation parameters, such as a mathematical operation and a specified value upon which the mathematical operation may operate, are associated with a host or group of hosts. The set of transformation parameters is applied to one or more memory addresses associated with an executable that is intended to run on the specified hosts. Such application of the set of transformation parameters may be applied to the executable at, or incident to, the compilation of the executable.

The hosts may be configured to implement a dynamic linker or other runtime-related layer that, at runtime of an executable, loads and/or locates various dependencies and executable code segments into/from specified runtime-related numerical locations, according to, e.g., the linking performed at the time of compilation of the executable. The dynamic linker or other runtime-related layer may apply the set of transformation parameters associated with the host or group of hosts to an incoming encoded executable at runtime so as to properly decode the executable's memory or other utilized numerical addresses and to, e.g., load the appropriate executable code into the correct memory locations, assuming that the set of transformation parameters used to encode the executable is the same or complimentary to that which is associated with the host or group of hosts on which the executable is intended (or authorized) to run. As may be contemplated, if the executable is not encoded properly with respect to the set of transformation parameters associated with the host or group of hosts attempting to execute it, the result of decoding the executable may be nonexecutable code, as the runtime-related numerical locations would not have been correctly decoded.

An example of a set of transformation parameters may include the application of bitwise exclusive OR (XOR) between memory addresses of an executable and a value associated (e.g., uniquely) with a host or group of hosts. For example, the XOR operations are performed between the various memory addresses enumerated by/in the executable for its segments, dependencies, etc. and the host-unique value, and the results of the operation replace the memory addresses in the encoded executable. At runtime, a dynamic linker or other runtime-related layer on the host performs a second set of XOR operations are performed with the host-unique value and the encoded memory addresses in the incoming encoded executable so as to generate the original (correct) memory locations or other runtime-related numerical locations, at which point the dynamic linker or other runtime-related layer may continue with loading the appropriate executable code into the now decoded memory locations or other runtime-related numerical locations.

Another example of a set of transformation parameters may include the use of asymmetric cryptography. For example, the memory addresses of the executable may be encrypted, such as in connection with a compiler, using a public key of an asymmetric key pair associated with a host or a group of hosts. At runtime, the dynamic linker or other runtime-related layer on the host decrypts the encrypted memory addresses using the private key of the asymmetric key pair (e.g., by using the facilities of an on-host trusted platform manager or a connected hardware security module). If the respective keys match, the original (correct) memory locations or other runtime-related numerical locations are generated, and the dynamic linker or other runtime-related layer may continue with its normal runtime initialization of the executable.

Figure 1:
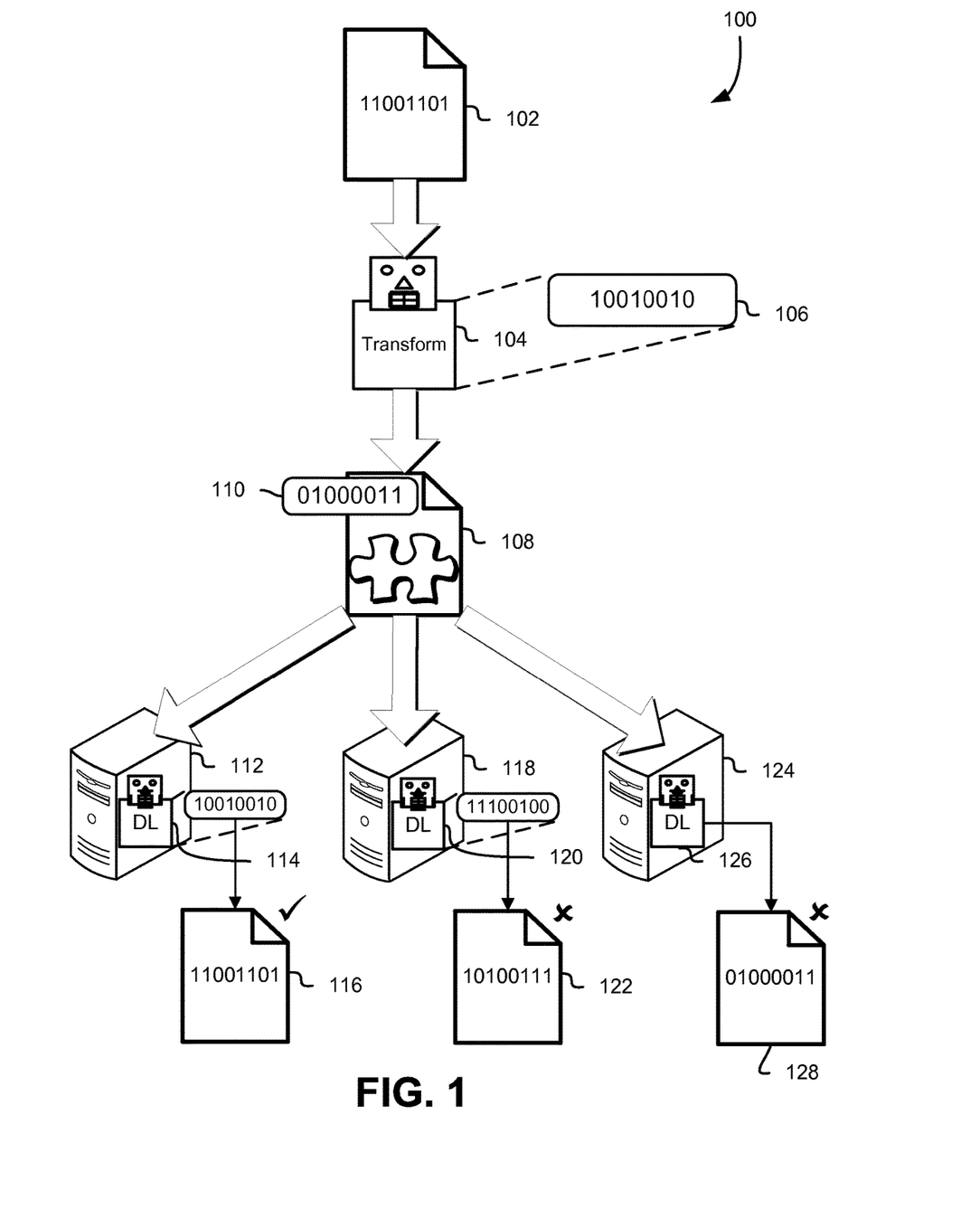
FIG. 1 schematically illustrates an environment in which selective permutation of executable code may be applied to control execution thereof on hosts configured in accordance with a set of transformation parameters, in accordance with some embodiments.

FIG. 1 schematically illustrates an environment in which selective permutation of executable code may be applied to control execution thereof on hosts configured in accordance with a set of transformation parameters, in accordance with some embodiments. An executable 102 (or a set of aspects thereof) is transformed 104 using a set of transformation parameters 106 to generate an encoded executable 108, which may have one or more aspects that have been transformed 110.

The executable 102 may be any executable code, in any format, that is capable of causing a computing system to perform tasks according to the instructions in the code. For example, the executable 102 may be a file or other data object (e.g., a binary) containing machine code instructions and/or bytecode. The executable 102 may include pointers, stubs, and other indications of memory locations or other runtime-related numerical locations to which various segments of the executable 102 and/or any data objects (e.g., libraries, shared objects, data files, system resources, and the like) upon which it depends should be located and/or placed, such as by a dynamic linker, dynamic loader, or other runtime-related layer, at or incident to runtime. The numerical values may represent specific locations in the addressable memory of the accessible system, may be in any format and/or of any length as appropriate for the implementation, and may depend on the nature of the runtime-related layer.

The runtime-related layer may be any entity that contains, accesses, and/or places executable code in locations that are numerically addressable (also referred to herein as "runtime-related numerical locations"). For example, the runtime-related layer may be a memory management unit of a host that accesses and/or translates memory addresses (memory locations) of the host. As another example, the runtime-related layer may be a dynamic linker or dynamic layer that locates and/or provides access to executable code, via link and/or memory locations/addresses. As yet another example, the runtime-related layer may be a layer of an operating system resident on the host that provides, e.g., addresses for calls to system functions provided by the operating system. As still another example, the runtime-related layer may be an address space layout randomization (ASLR) layer, and the runtime-related numerical locations may be offsets rather than specific memory locations.

The executable 102 may be formatted or otherwise structured in a fashion that is appropriate for the operating system and/or host architecture for which it is intended. For example, the executable may be formatted as a Portable Executable (PE), Executable and Linkable Format (ELF), Mach object (Mach-O), MZ, COM file, and the like. In some embodiments, the executable 102 may be formatted for multiple architectures. In some embodiments, the executable may include various tables that point to various data requirements (such as segments of executable code, external dependencies, and the like) as well as the appropriate memory locations or other runtime-related numerical locations for such data requirements at which the executable expects, e.g., a dynamic linker, loader, or other runtime-related layer to place the various data requirements at or incident to runtime.

The transform 104, which may be part of a set of transformation parameters 110, may be performed by any entity, whether software or hardware, capable of applying computation to data. Examples include physical computing systems (e.g., servers, desktop computers, laptop computers, thin clients, and handheld devices such as smartphones and tablets), virtual computing systems (e.g., as may be provided by a computing resource service provider using one or more resources associated therewith), services (e.g., such as those provided by a computing resource service provider) via application programming interface calls, web service calls, or other programmatic methods), and the like. In some embodiments, the transform 104 may be performed during or incident to compilation, such as by the entity performing the transform 104, of the executable 102. In some embodiments, the transform 104 may be performed at a time after the executable 102 has been compiled. The entity performing the transform 104 and the compilation may be the same entity, or different entities.

Along with the transform 104, the set of transformation parameters 106 may also include a value, key, or other identifier associated with one or more hosts (e.g., hosts 112, 118, 124). For example, the value may be arbitrarily chosen and associated with one or more hosts on which a given executable 102 is intended to execute. The value may correspond to an existing value associated with a given host, such as a host identifier. In some embodiments, the value may be derived based on one or more operating parameters of the host(s) on which the executable 102 is intended to execute. In some embodiments, the value may be a shared secret between an entity performing the transform 104 and the host(s). In some embodiments, the value may be generated, stored, and/or otherwise made available by an entity separate from the entity performing the transform 104, the host(s) 112, 118, 124, or both. In some embodiments, the set of transformation parameters 106 may include cryptographic information, such as cryptographic keys. In embodiments where the set of transformation parameters 106 includes cryptographic information, such cryptographic information may include symmetric keys, shared secrets (e.g., between an entity performing the transform 104 and some component associated with a host 112, 118, 124), asymmetric key pairs, and the like.

As discussed, numerous variations of the transform 104 (and, by extension, the set of transformation parameters 106) utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CASTS, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

The transform 104 itself may be any invertible, reversible, or mappable mathematical or computational function or set of functions. For example, the transform may include the application of bitwise exclusive OR (XOR) to, e.g., some or all of the memory locations or other runtime-related numerical locations of the executable and an environment-specific value as previously described. As another example, as previously discussed, the transform may include encryption and decryption, whereby the key is either a shared secret or, in the case that asymmetric cryptographic techniques are used, a public key may be used to encrypt the memory locations or other runtime-related numerical locations while the associated private key may be held or under control of one or more hosts upon which the executable is intended to be run. As another example, the transform 104 may include mapping or permuting, e.g., memory locations or other runtime-related numerical locations of an executable to indexed values (of, e.g., a bounded set that is known at the time a given hash function is applied) such that when the indexed values are run through a hash function, values representing original memory locations or other runtime-related numerical locations are returned.

The hosts 112, 118, 124 may be any computing resource or collection of such resources capable of receiving and executing executable code. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the hosts 112, 118, 124 via application programming interface calls, web service calls, or other programmatic methods), and the like. In some embodiments, the resources of the hosts 112, 118, 124 may be one or more resources of a computing resource service provider, such as that described in further detail below.

The respective hosts 112, 118, 124 may include dynamic linkers, dynamic loaders, or other runtime-related layer 114, 120, 126, configured to place or locate, at runtime of the executable, various portions of executable code (such as segments of the executable 102, dependencies of the executable 102 that may be separate from the executable 102, and the like) in various memory locations or other runtime-related numerical locations specified, e.g., in and/or by the executable 102. Such dynamic linkers or other runtime-related layers (e.g., 112, 118) may be configured with environment-specific values or keys (e.g., 114, 120) as well as a transform similar to, the same as, and/or complimentary to the transform 104 that generated the encoded executable 108 in the first instance.

In the illustrated example, the transform 104 is bitwise exclusive OR and the value is specific to the host 112 (as shown in 114), and different from that of host 118 (as shown in 120). In this example, a given memory location of the executable 102 (shown as 11001101) is XORed against the environment-specific value (illustrated as 10010010) to generate a transformed or encoded memory location 110 (illustrated as 01000011). At runtime, a dynamic linker or other runtime-related layer configured with the environment-specific value 114 transforms, using exclusive OR, the encoded memory location 110 (shown as 01000011) against the environment-specific value 114 (illustrated as 10010010) to generate the correct, original memory location 116 (illustrated as 11001101), thereby allowing the executable 116 to execute normally (as whatever executable code was designated to be placed at memory location 11001101 will be placed in the correct location).

As a further example, a different host 118 has a dynamic linker or other runtime-related layer configured with a different environment-specific value 120 than the one used to encode the illustrated executable (e.g., 102, 106). When the host transforms, using exclusive OR, the encoded memory location 110 against the environment-specific value 120, a memory location value 122 different than that of the one specified by the original executable 102 is generated. If executed, the executable may not be operable by virtue of the executable code that was intended to be stored in a given location being placed in an entirely different location. In some embodiments, a resource of, e.g., the dynamic linker or other runtime-related layer or the host 118 itself may detect this condition and prevent the executable from further execution, e.g., by causing the dynamic linker or other runtime-related layer to suspend its operations with regard to the executable. In some embodiments, an attempt to run an improperly encoded or unencoded executable may initiate one or more mitigation workflows that, for example, cause a resource of the host to sandbox the executable and/or any execution of executable code associated therewith and/or alert an operator or system associated with the host that the executable (and, in some embodiments, executables similar to that executable) may be malicious or otherwise improperly encoded.

As yet another example, if a different host 124 is configured with a dynamic linker or other runtime-related layer that does not apply transforms as described herein, any encoded application 108 will fail to function for similar reasons as if the application the decoding of such application was performed using a different environment-specific value (e.g., 120) than that which was used to encode the memory locations or other runtime-related numerical locations (see, e.g., 128).

While the examples provided focus on the use of exclusive OR and cryptographic techniques, other transformation parameters and transforms are contemplated hereby, and may be used in any combination or number. Additionally, permutations, transforms, and the like, as described herein, may happen at any appropriate time in connection with the respective compilation and/or execution, and, in some embodiments, may occur after the initiating event (e.g., transforms may occur after compilation, reverse permutations by the runtime-layer may occur after initiation of execution of the executable, etc.).

Figure 2:
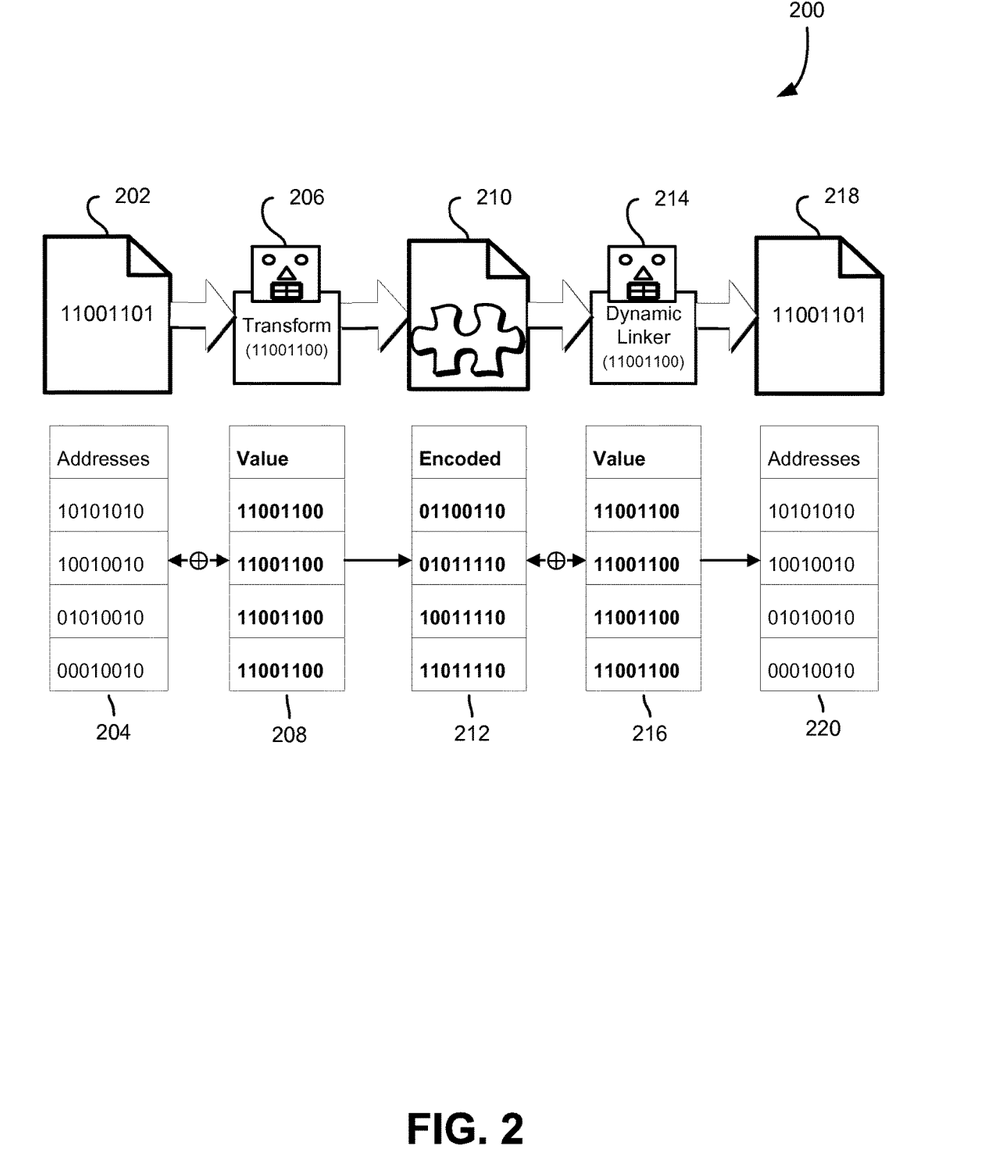
FIG. 2 schematically illustrates example workflows for techniques using mathematical operations to permute executable code for secure execution, in accordance with some embodiments.

FIG. 2 schematically illustrates example workflows for techniques using mathematical operations to permute executable code for secure execution, in accordance with some embodiments. An executable 202 includes memory addresses 204 at which the executable 202 will access portions of executable code associated with the executable 202 at runtime. The executable 202 may be similar to the executable described above in connection with FIG. 1. The memory addresses may be any values that specify one or more addressable memory locations or other runtime-related numerical locations of a computing device such as a host, may be either physical or logical addresses (such as those provided by the operating system operating on the host). The values themselves may be of any appropriate type, such as unsigned integers, and of any appropriate length. In some embodiments, the length of the value may correspond to the overall addressable range of memory extant on the host. For example, a host with a 32-bit addressable memory space may accept and use memory addresses that are 32 bits in length.

The executable 202 is subject to a set of transformation parameters 206, which may include a transform as described above in connection with at least FIG. 1, using a value of the set of transformation parameters 206. As previously discussed in connection with FIG. 1, the value used may be environment-specific, e.g., specific to an execution environment corresponding to one or more hosts on which the executable is intended to run, and which implements routines to permute incoming executables so as to only execute those which have been properly encoded for that host. The transform used by the set of transformation parameters may be any mathematical function or combination of functions that, when used according to the techniques described herein, provide the original value as output if specified requirements are met. In some embodiments, the value may be derived based on one or more operating parameters of the host(s) on which the executable 202 is intended to execute. In some embodiments, the value may be a shared secret between an entity performing the transform 206 and the host(s). In some embodiments, the value may be generated, stored, and/or otherwise made available by an entity separate from the entity performing the transform 206, the host(s) or both.

For example, in the illustrated example, bitwise exclusive OR is used to transform the memory addresses 204 against a fixed value 208 so as to generate encoded memory addresses 212, which may in some embodiments be written back into the executable to generate an encoded executable 210. As may be contemplated, the encoded executable may not be operable on computing devices (e.g., hosts) not configured to decode the encoded memory locations or other runtime-related numerical locations 212 (or do so using different parameters, e.g., a different set of transformation parameters, than those used to encode them in the first place). As previously discussed, the executable 202 may be subject to a set of transformation parameters 206 at compile time, in connection with compilation, or at some independent point in time after compilation, but before runtime.

A computing device, such as a host, may incorporate a dynamic linker or other runtime-related layer 214 that is configured to apply a set of transformation parameters similar or complimentary to the set of transformation parameters 206, e.g., at runtime. In the illustrated example, the dynamic linker or other runtime-related layer 214 performs the same exclusive OR operations using the same value 216 (e.g., the environment-specific value) on the encoded memory addresses 212, so as to generate memory addresses 220, which are the same as the original memory addresses 204. As a result, an encoded executable 210, when run through an appropriately configured dynamic linker or other runtime-related layer 214, may be executed on an implementing computing device (e.g., a host or group of hosts) as if the executable was unmodified (e.g., 218, 202).

Figure 3:
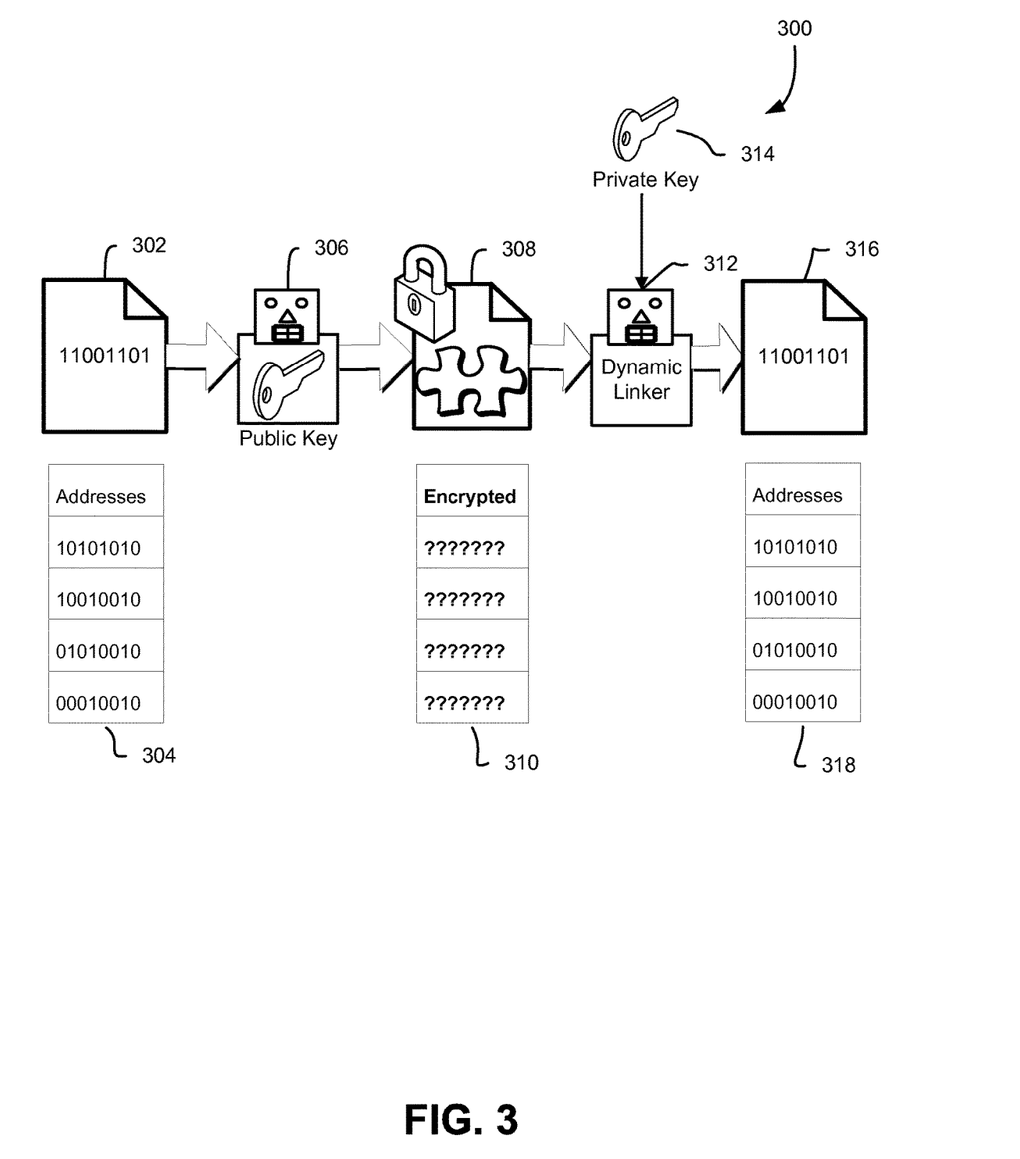
FIG. 3 schematically illustrates example workflows for techniques using asymmetric encryption to permute executable code for secure execution, in accordance with some embodiments.

FIG. 3 schematically illustrates example workflows for techniques using asymmetric encryption to permute executable code for secure execution, in accordance with some embodiments. An executable 302, which may be similar to the executables described in connection with at least FIGS. 1 and 2 above, is configured with memory addresses 304, which may be similar to the memory addresses also described in at least FIGS. 1 and 2 above. A public key 306, such as a public key of an asymmetric key pair, is used to encrypt the memory addresses 304 to generate an encoded executable 308 with encrypted memory addresses 310. As with the example provided in FIG. 2, the encoding and encryption may take place as a part of compilation of the executable 302, incident to the compilation, or at some time after compilation (but prior to runtime).

At, incident to, or prior to runtime, the dynamic linker or other runtime-related layer 312 operating on the target computing device (e.g., host) may be configured to obtain or use the corresponding private key 314 of the asymmetric key pair, if the target computing device is authorized to obtain the corresponding private key 314. For example, the private key may be stored on a cryptographic module, such as a trusted platform module (TPM) or a hardware security module (HSM) attached or connected to the computing device (e.g., over a network or through a data bus), and the encryption may occur on the module harboring the private key. In some embodiments, the private key may be stored locally on the computing device, or provided directly by the cryptographic module (and thus, cryptographic operations such as encryption are conducted on the computing device itself rather than being offloaded onto the cryptographic module). It may be appreciated that in either case, the private key 314 may only be provided or used by a computing device or host authorized to access or use it, and as such, if the dynamic linker or other runtime-related layer is unable to decrypt the encrypted memory addresses 310, the encoded executable may not be operable.

In the case that the dynamic linker or other runtime-related layer 312 successfully negotiates access and/or use of the private key 314, prior to, as part of, or incident to runtime operations, the encrypted memory addresses 310 are decrypted using the private key 314 to generate the original memory addresses 318, whereupon the executable may behave as originally intended 316. In some embodiments, a plurality of computing devices may share or be authorized to access the same private key 314. As a result, in such embodiments, groups of computing devices may be defined and controlled with regard to whether a given executable is operable on them by, e.g., providing such groups access to the same private key 314. Conversely, executables 302 may be encoded such that they are restricted from running on anything other than specified computing devices so controlled.

Figure 4:
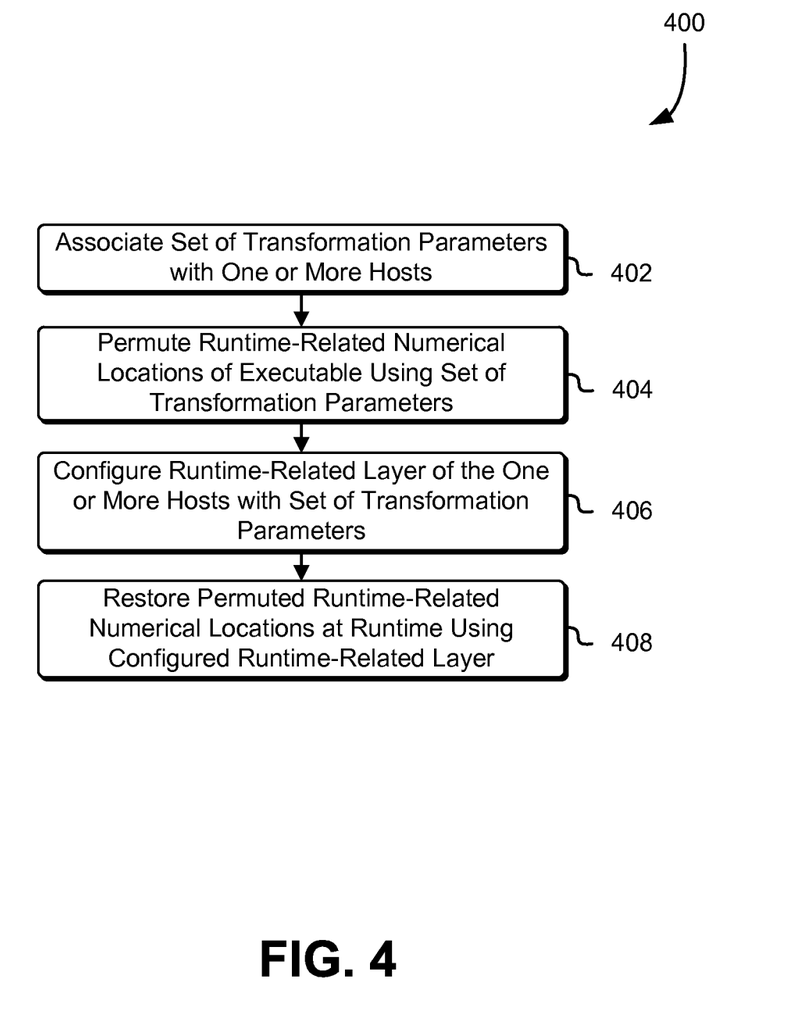
FIG. 4 schematically illustrates an example process for permuting executable code using a set of transformation parameters known to a set of hosts, in accordance with some embodiments.

FIG. 4 schematically illustrates an example process for permuting executable code using a set of transformation parameters known to a set of hosts, in accordance with some embodiments. At step 402, a set of transformation parameters is associated, such as by an entity in communication with and/or controlling a plurality of hosts (e.g., a computing resource service provider), with one or more of the plurality of hosts. As previously described in connection with at least FIGS. 1 through 3 above, the set of transformation parameters may include one or more environment-specific values, such as control values, cryptographic keys, and the like.

At step 404, values of, e.g., memory addresses used by an executable are permuted, such as by a compiling entity or other resource of a computing device, using the set of host-associated transformation parameters as used in connection with step 402. In some embodiments, only a subset of the memory addresses used by the executable is permuted.

At step 406, a dynamic linker or other runtime-related layer of the corresponding target hosts (e.g., the hosts upon which the executable is intended to run) are configured, such as by the computing resource service provider, or by the hosts themselves, with the set of transformation parameters so as to perform the permutations defined by the set of transformation parameters on some or all executables to which the dynamic linker or other runtime-related layer is subject. As may be contemplated, the configuration of the dynamic linker or other runtime-related layer and of the target hosts may be performed first, so as to prevent any non-encoded or differently-encoded executable from operating on the target hosts, thereby conversely preventing the target hosts from operating the executable. In embodiments where the runtime-related layer is a memory management unit of the host, it may be contemplated that if the memory management unit is configured with the set of transformation parameters, no executable—whether or not the executable relies on dynamically linked dependencies, system calls, and the like—that is not appropriately encoded will be operable on a host so configured.

At step 408, the permuted address values of the encoded executable are restored, if the dynamic linker or other runtime-related layer is configured to do so (e.g., at step 406, if the target host is authorized to run the executable), prior to, incident to, or during runtime, so as to execute the encoded executable normally. As previously mentioned, the permuted address values may not be appropriately restored if the dynamic linker or other runtime-related layer is not configured with the appropriate set of transformation parameters necessary to decode the executable.

Figure 5:
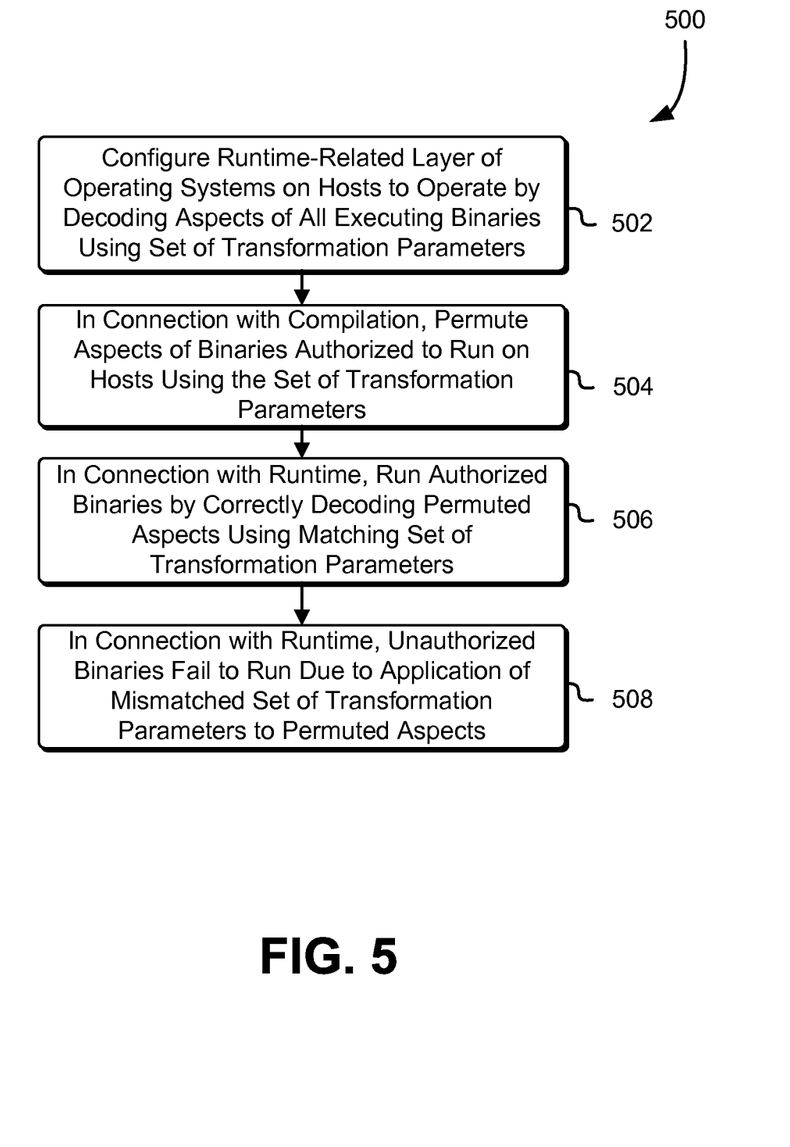
FIG. 5 schematically illustrates an example process for selective execution of executable code using permutation techniques, in accordance with some embodiments.

FIG. 5 schematically illustrates an example process for selective execution of executable code using permutation techniques, in accordance with some embodiments. At step 502, an entity in control of one or more hosts, such as an entity of a computing resource service provider, configures the dynamic linker or other runtime-related layer(s) of operating system(s) operating on the host(s) to decode, in connection with, during, or prior to runtime of a given executable, any executable (e.g., binary) attempting to execute on the host. As previously mentioned, in some embodiments, the permutations caused by the decoding may be performed on memory addresses used by the incoming executable, regardless of the provenance or encoding status of the incoming executable. As a result, also as previously mentioned, those executables that are not encoded using the appropriate set of transformation parameters (e.g. those complementary to the ones used by the dynamic linker or other runtime-related layer(s)) may not be operable.

At step 504, one or more executables (e.g., binaries) are encoded by, e.g., permuting various aspects of the binaries (such as memory addresses used and delineated in the executable binary) using the set of transformation parameters used to configure the dynamic linkers or other runtime-related layers of the hosts at step 502. Such executables may be selected by, e.g., an entity in control of the hosts and/or the executables, to be run on the specified hosts. In some embodiments, as previously discussed, the set of transformation parameters used to encode the binaries may be complementary to those used to configure the dynamic linker or other runtime-related layer(s) in step 502. For example, the binaries may be encoded by encrypting its memory addresses or other runtime-related numerical locations using a private key of an asymmetric key pair, while a host upon which the encoded binaries are authorized to run may decode such binaries by decrypting the memory addresses, incident to runtime, using the private key of the same asymmetric key pair.

At step 506, as previously discussed, authorized binaries, e.g., those encoded to operate on a specified host or set of hosts with dynamic linkers or other runtime-related layers configured to correctly operate them by being configured with a matching set of transformation parameters, are allowed to operate on such hosts. In the inverse, at step 508, binaries that have been encoded to operate on a different set of hosts, e.g., by having been encoded on a non-matching set of transformation parameters or not having been encoded at all, are denied from operating. In both cases, the allowance and/or denial of operation of such binaries may be inherent to the way in which the binaries were encoded and subsequently decoded (e.g., as a virtue of how the binaries were encoded, decoding them with the wrong set of transformation parameters would result in a non-functional binary). In other embodiments, an additional check may be performed to ascertain whether the aspects, e.g., memory addresses, were correctly decoded, prior to any further attempt to initialize or execute the binaries.

Figure 6:
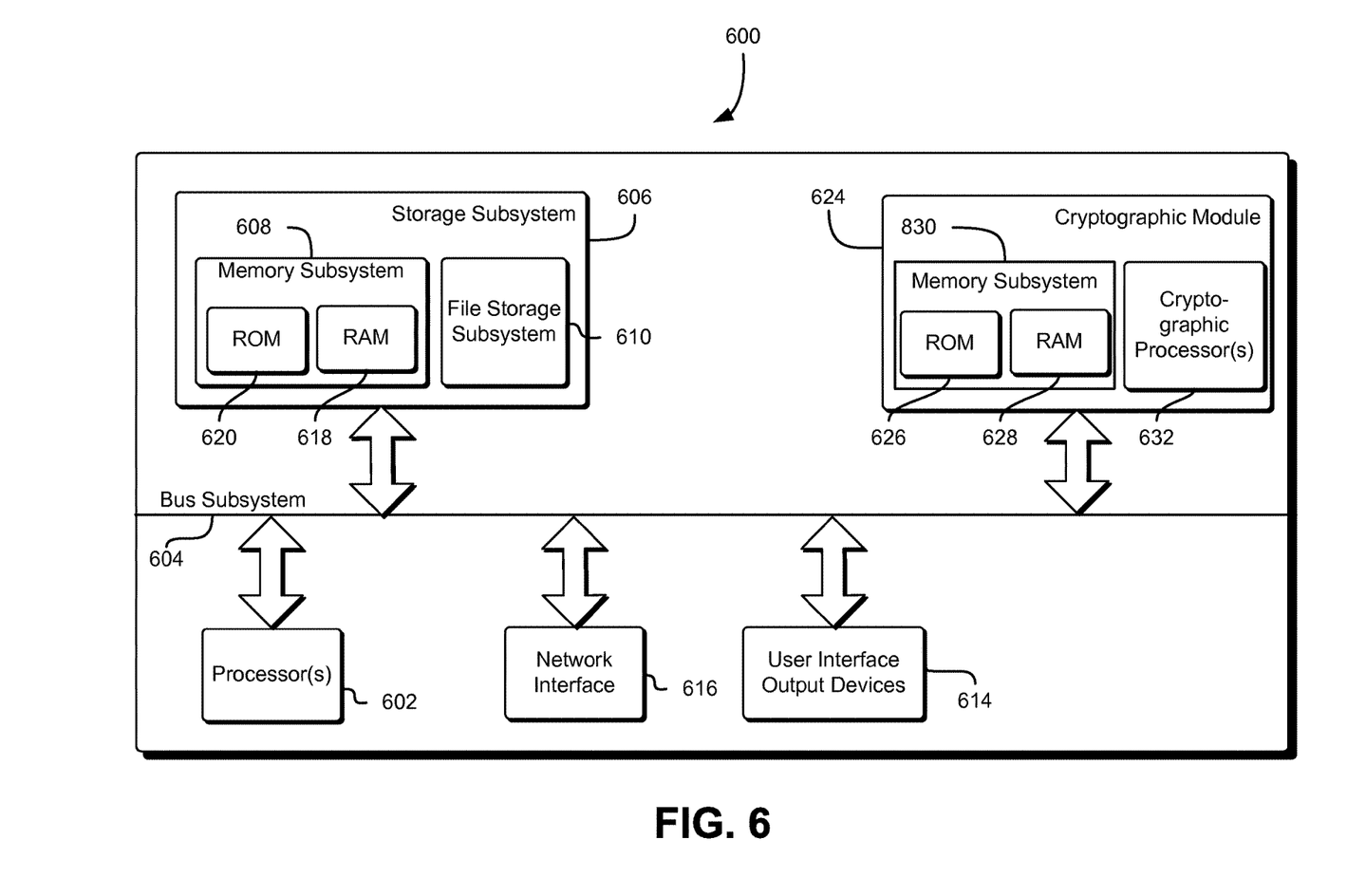
FIG. 6 is an illustrative, simplified block diagram of an example computing device that may be used to practice at least one embodiment of the present disclosure.

FIG. 6 is an illustrative, simplified block diagram of an example computing device 600 that may be used to practice at least one embodiment of the present disclosure. In various embodiments, the device 600 may be used to implement any of the systems (e.g., hosts) illustrated herein and described above. For example, the device 600 may be used to implement verification equipment, in accordance with various embodiments. As shown in FIG. 8, the device 600 may include one or more processors 602 that may be configured to communicate with and are operatively coupled to a number of peripheral subsystems via a bus subsystem 604. These peripheral subsystems may include a storage subsystem 606, comprising a memory subsystem 608 and a file storage subsystem 610, one or more user interface output devices 614, a network interface subsystem 616, a cryptographic module 624, comprising a memory subsystem 630 and one or more cryptographic processors 632.

The bus subsystem 604 may provide a mechanism for enabling the various components and subsystems of device system 600 to communicate with each other as intended. Although the bus subsystem 604 is shown schematically as a single bus, alternative embodiments of the bus subsystem may utilize multiple busses.

The network interface subsystem 616 may provide an interface to other device systems and networks, such as between hosts, to receive executables, and to communicate with, e.g., hardware security modules and other external cryptographic modules. The network interface subsystem 616 may serve as an interface for receiving data from and transmitting data to other systems from the device system 600. For example, the network interface subsystem 616 may enable transmission of computing device signatures and other information, such as electronic requests to access a system (e.g., receive a webpage) and may enable receipt of responses to the requests, such as webpages or other information. The network interface subsystem 616 may also facilitate the receipt and/or transmission of data on other networks, such as an organizations intranet and/or other networks described below.

User interface output devices 614, if any, may include a display subsystem or non-visual displays, such as audio and/or tactile output devices, etc. Generally, the output devices 614 may invoke one or more of any of the five senses of a user. The display subsystem may be a cathode ray tube (CRT), a flat-panel device, such as a liquid crystal display (LCD), light emitting diode (LED) display, or a projection or other display device. In general, use of the term "output device" is intended to include all possible types of devices and mechanisms for outputting information from the device system 600. The output device(s) 614 may be used, for example, to present user interfaces to facilitate user interaction with applications performing processes described herein and variations therein, when such interaction may be appropriate, such as presenting the user with information corresponding to a signature determined for a connected computing device. While a device 600 with user interface output devices is used for the purpose of illustration, it should be noted that the device 600 may operate without an output device, such as when the device 600 is operated in a server rack and, during typical operation, an output device is not needed.

The storage subsystem 606 may provide a computer-readable storage medium for storing the basic programming and data constructs that may provide the functionality of at least one embodiment of the present disclosure, such as those provided by an executable. The applications (executables, programs, code modules (i.e., programming modules), instructions) that, when executed by one or more processors, may provide the functionality of one or more embodiments of the present disclosure, may be stored in the storage subsystem 606. These application modules or instructions may be executed by the one or more processors 602. The storage subsystem 606 may additionally provide a repository for storing data used in accordance with the present disclosure. The storage subsystem 606 may comprise a memory subsystem 608 and a file/disk storage subsystem 610.

The cryptographic module 624, which may be a trusted platform module (TPM), includes a memory subsystem 630, including a main random access memory (RAM) 628 for storage of instructions and data during program execution and a read only memory (ROM) 626, in which fixed cryptographic information may be stored, such as a hardware secret stored securely within the device 600 so as to be non-exportable (i.e., inaccessible through any call to the cryptographic module 624). The cryptographic module 824, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 11889, which are incorporated herein by reference. The device 600 may also store cryptographic keys in RAM 628 and/or processor registers for temporary cryptographic processing. The cryptographic information stored in memory may be used in combination with cryptographic information obtained via the network interface 616 and/or one or more of the user interface input devices 612. The one or more cryptographic processors may be used to perform cryptographic operations in the device and may include a random number generator, SHA-2 or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include, but are not limited to algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure. Generally, one or more components of the cryptographic module 924 may be configured to collectively perform various operations used generating cryptographically verifiable information for authentication objects.

As noted above, in various embodiments of the present disclosure, hardware secrets may be securely stored within the cryptographic module 624. In some embodiments, the cryptographic module is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs and/or other devices whose physical characteristics encode information usable as or for a hardware secret.

Figure 7:
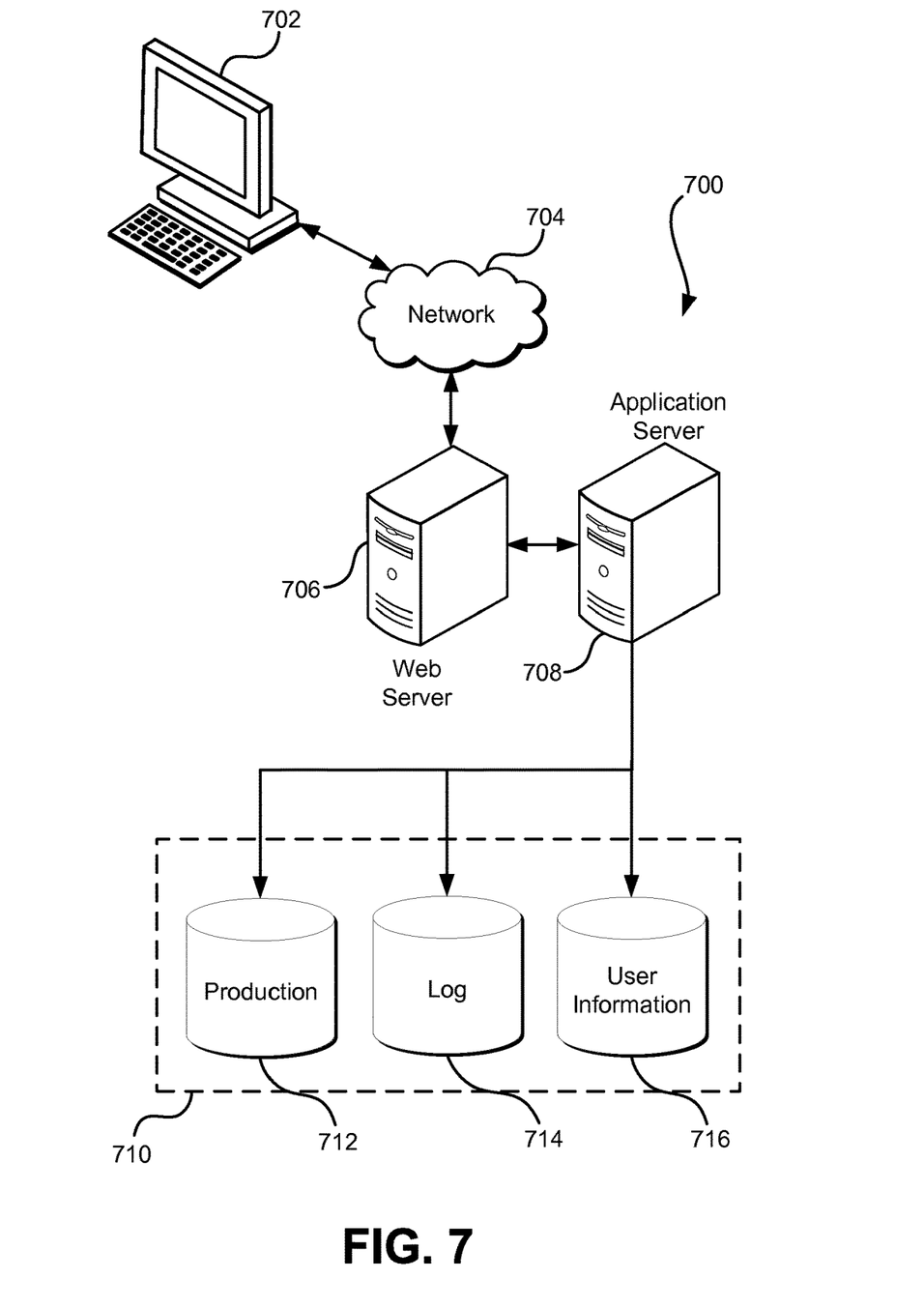
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 702 and the application server 708, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    applying a first set of transformation parameters, the first set of transformation parameters associated with a first host, to transform executable code to permute, using the first set of transformation parameters, one or more memory addresses in which one or more portions of the executable code are stored, thereby generating transformed executable code;
    generating, based at least in part on the first set of transformation parameters and a parameter associated with a second host, a second set of transformation parameters;
    configuring the second host with the second set of transformation parameters, to cause a runtime-related layer associated with the second host to apply the second set of transformation parameters to the transformed executable code in connection with runtime of the transformed executable code, thereby generating a configured second host;
    in connection with the runtime of the transformed executable code, causing the runtime-related layer of the second host to decode the transformed executable code into decoded executable code, by applying the second set of transformation parameters to the permuted one or more memory addresses to restore the one or more memory addresses storing the one or more portions to a state prior to the permuting; and
    causing the second host to execute the decoded executable code.

2. The computer-implemented method of claim 1, wherein the first set of transformation parameters and the second set of transformation parameters match.

3. The computer-implemented method of claim 1, wherein:
    the first set of transformation parameters includes encryption using a public key of an asymmetric key pair; and
    the second set of transformation parameters includes decryption using a private key of the asymmetric key pair.

4. The computer-implemented method of claim 1, wherein the first set of the transformation parameters and the second set of transformation parameters include one or more bitwise exclusive OR operations using a value associated with the second host.

5. A system, comprising:
    at least one computing device that implements one or more services, wherein the one or more services at least:

permute, using a first subset of a set of transformation parameters associated with a first host, one or more locations in which an executable is stored, such that the executable is incapable of execution without a different second subset of the set of transformation parameters;

generate, based at least in part on the first subset and a parameter associated with a second host, the second subset;

configure a runtime-related layer of the second host with the second subset, to cause the runtime-related layer to revert, in connection with runtime of the executable, the permuted locations storing the executable using the second subset; and cause the second host to attempt execution of the executable using the runtime-related layer.

6. The system of claim 5, wherein the one or more locations storing the executable code are permuted by encoding memory addresses used by the executable.

7. The system of claim 5, wherein the one or more services are configured to permute the one or more locations storing the executable in connection with compiling the executable.

8. The system of claim 5, wherein:
the set of transformation parameters includes an asymmetric key pair;
the first subset is a public key of the asymmetric key pair; and
the one or more services are configured to permute the one or more locations storing the executable code by encrypting the one or more locations using the public key.

9. The system of claim 8, wherein:
the second subset is a private key of the asymmetric key pair; and
the one or more services are configured to configure the runtime-related layer to decode the executable by decrypting the encrypted one or more locations storing the executable using the private key.

10. The system of claim 9, wherein the one or more services are configured to configure the runtime-related layer by causing the runtime-related layer to interface with a trusted platform module in communication with the runtime-related layer, the trusted platform module storing the private key.

11. The system of claim 9, wherein the one or more services are configured to configure the runtime-related layer by causing the runtime-related layer to interface with a hardware security module in communication with the runtime-related layer, the hardware security module storing the private key.

12. The system of claim 5, wherein the set of transformation parameters includes an invertible mathematical operation that is applicable to the one or more locations storing the executable code.

13. A non-transitory computer-readable storage medium having stored thereon instructions that, upon execution by one or more processors of a computer system, cause the computer system to at least:
determine that an executable is authorized to be executed in an execution environment of the computer system, the executable stored in one or more runtime locations that are encoded such that the executable cannot be executed without authorization;
at a time after receiving the executable, decode the executable by applying a first set of transformation parameters to the one or more runtime locations storing the executable, the first set of transformation parameters corresponding to a parameter associated with the computer system and a second set of transformation parameters used to encode the one or more runtime locations storing of the executable; and
execute the executable after decoding.

14. The non-transitory computer-readable storage medium of claim 13, wherein the instructions further comprise instructions that, upon execution by the one or more processors, cause the computer system to, if the second set of transformation parameters mismatches the first set of transformation parameters, prevent the executable from executing.

15. The non-transitory computer-readable storage medium of claim 13, wherein the instructions further comprise instructions that, upon execution by the one or more processors, cause the computer system to, if the first set of transformation parameters mismatches the second set of transformation parameters, prevent the executable from executing by virtue of the decoded executable being non-functional.

16. The non-transitory computer-readable storage medium of claim 13, wherein:
the first set of transformation parameters includes an exclusive OR operation; and
the instructions further comprise instructions that, when executed by the one or more processors, cause the computer system to decode the executable by applying the exclusive OR operation to the one or more runtime locations storing the executable by performing the exclusive OR operation against a value identifying the computer system.

17. The non-transitory computer-readable storage medium of claim 13, wherein the one or more runtime locations includes memory addresses accessed by the executable during runtime.

18. The non-transitory computer-readable storage medium of claim 13, wherein the first set of transformation parameters corresponds with the second set of transformation parameters when the first set of transformation parameters is the same as the second set of transformation parameters.

19. The non-transitory computer-readable storage medium of claim 13, wherein:
the first set of transformation parameters includes a first cryptographic key; and
the second set of transformation parameters includes a second cryptographic key.

20. The non-transitory computer-readable storage medium of claim 13, wherein the second set of transformation parameters was used by a compiler of the executable to encode the one or more runtime locations storing the executable.

* * * * *